United States Patent Office 2,725,415
Patented Nov. 29, 1955

2,725,415

OXYGEN-SOFTENING OF RUBBER

Edward M. Bevilacqua, Allendale, N. J., assignor to United States Rubber Company, New York, N. Y., a corporation of New Jersey No Drawing. Application March 26, 1953, Serial No. 344,908

14 Claims. (Cl. 260—742)

This invention relates to accelerating the oxygen-softening of rubber in latex form.

It is gnown that the absorption of oxygen by rubber latex will soften or break down the rubber and that adhesives may be prepared by sufficient oxidation of the latex. The oxidation of rubber in latex by a gas containing free oxygen, however, is a relatively slow process, even in the presence of known accelerators for such oxidative breakdown of the rubber, e. g. aromatic hydrazines and metal salts.

I have found that the absorption of oxygen by latex from a free-oxygen-containing gas is greatly accelerated by the presence in the latex of small amounts of an organic hydroperoxide, a water-soluble iron salt, an alkylene polyamine polyacetic acid, and a ketose.

In carrying out the present invention, Hevea rubber latex is brought into intimate contact with a free-oxygen-containing gas, as by agitating in a closed vessel connected to a supply of oxygen, in the presence of an organic hydroperoxide in which an oxygen of the hydroperoxide radical is attached to a tertiary carbon atom, a water-soluble iron salt, an alkali salt of an amino acid, viz., an alkylene polyamine polyacetic acid, and a ketose. The temperature of the treatment is not critical. Temperatures from 15° C. to 50° C. are generally satisfactory, but higher temperatures to 90° C. may be used. The treatment with the oxygen is continued until the desired extent of rubber softening or oxygen absorption has been accomplished. Any desired amount of oxygen can be absorbed to give the desired softening of the rubber. Usually, however, the absorption of 2 to 30 millimoles of oxygen per 100 grams of solids of the latex is in the practical range. This gives appreciable softening of the rubber with the lower amounts of absorbed oxygen and a highly broken down rubber, and an adhesive latex with the higher amounts of absorbed oxygen within this range. The extent of softening may be controlled by adjustment of the amount of hydroperoxide used so that the hydroperoxide is exhausted when the desired softening stage has been reached, or the addition of a small amount, e. g., 0.1 to 5% of the weight of the solids in the latex, of an alkali salt of a substituted dithiocarbamic acid, e. g., the sodium or ammonium or dimethylammonium salt of a monoalkyl dithiocarbamic acid or of a dialkyl dithiocarbamic acid, when the desired softening stage has been reached, will deactivate any residual hydroperoxide. The oxygen in the free-oxygen-containing gas may be at any desired pressure, e. g. from a partial pressure of 0.1 atmosphere or less, to 25 or more atmospheres pressure. Conveniently the oxygen pressure is one atmosphere, or the 0.2 atmosphere partial pressure of oxygen in an air supply at one atmosphere pressure. Oxygen at a pressure of substantially one atmosphere is at present preferred. The latex is conveniently an alkaline natural rubber latex, e. g., an ammonia-preserved Hevea latex of normal solids content or an ammonia-preserved concentrated Hevea latex from a centrifuging or chemical creaming operation.

The amounts of organic hydroperoxide, iron salt, alkali salt of the amino acid, and ketose are not critical; amounts of the organic hydroperoxide and of the ketose from 0.05 to 5 percent of the weight of solids in the latex are satisfactory, and amounts of the iron salt and of the alkali salt of the alkylene polyamine polyacetic acid from 0.01 to 0.5 percent of the weight of solids in the latex are satisfactory. The alkali salt of the amino acid should be used in amounts of at least one mole per mole of iron salt. Examples of organic hydroperoxides that may be used are:

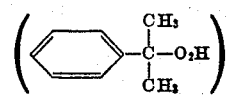

Cumene hydroperoxide

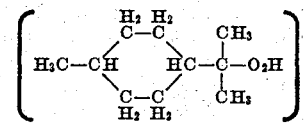

p-Menthane hydroperoxide

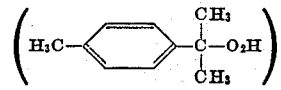

p-Cymene hydroperoxide

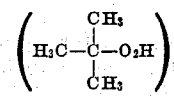

t-Butyl hydroperoxide

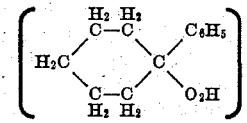

Cyclohexyl benzene hydroperoxide

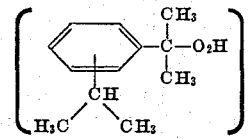

Diisopropyl benzene hydroperoxide

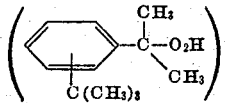

t-Butyl isopropyl benzene hydroperoxide

Examples of water-soluble iron (ferrous or ferric) salts that may be used are ferrous sulfate, ferrous chloride and ferric chloride. Ferrous sulfate is the preferred iron salt. Examples of the alkylene polyamine polyacetic acids that are included in the form of their alkali salts, are ethylene diamine polyacetic acids and the polyethylene polyamine polyacetic acids. The preferred alkylene polyamine polyacetic acids are those having the general formula

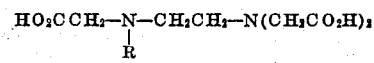

where R is methyl, ethyl, $HO_2CCH_2$— or

The compounds with R as such substituents are N-methyl ethylene diamine triacetic acid, N-ethyl ethylene diamine triacetic acid, ethylene diamine tetraacetic acid, and diethylene tramine pentaacetic acid, respectively. One or more of the acid radicals may be neutralized to form the alkali salt. Generally all the acid radicals will be neutralized, and in an alkaline medium, such as in ammonia-preserved latex, any acid radicals not already neutralized in the salt as added will be neutralized by the free ammonia or other alkali in the latex. Examples of ketoses that may be used are ketotrioses, ketotetroses, ketopentoses, ketohexoses and ketoheptoses. The preferred ketoses are those having the general formula:

$$CH_2OH-CO-(CHOH)_nH$$

where $n$ is an integer from 1 to 5, e. g. dihydroxy acetone where $n$ is 1, and sorbose and fructose where $n$ is 4.

The following examples are illustrative of the invention. All parts and percentages referred to herein being by weight:

Example I

To a commercial centrifuged Hevea rubber latex concentrate of 62.5% total solids preserved with 0.6% of ammonia based on the latex, was added 0.06% of ferrous sulfate heptahydrate, 0.13% of the tetraammonium salt of ethylene diamine tetraacetic acid, 0.8% of sorbose and 1.2% of cumene hydroperoxide, based on the solids of the latex. These materials were added to the latex in the form of aqueous solutions or emulsions. The latex was then agitated in a closed vessel in an atmosphere of oxygen at 50° C. at a pressure of one atmosphere. The latex absorbed oxygen slowly for about 30 minutes; the rate increased to a maximum of about 12 millimoles of oxygen per 100 grams of latex solids per hour. After about 26 millimoles of oxygen had been absorbed, the rate of absorption fell off. The oxidation in this and the following examples was carried on for about three or four hours. A dried sample of rubber from this latex had a Mooney viscosity, ML-4 (212° F.), of less than 15 and was very tacky to the touch. Mooney viscosity measurements are well known in the rubber industry where they are used as standards of measurement of the voscosity of rubbers. Mooney viscosity measurements are made on a Mooney Shearing Disc Plastometer or Viscometer. This instrument has been described by M. Mooney in Industrial & Engineering Chemistry (Anal. Ed.) 6, 147 (1934). By means of this device, the viscosity of a plastic material in shear may be quantitatively measured. The viscosity readings are based on an arbitrary standard: the lower the readings, the lower is the viscosity, and hence the greater is the plasticity. The Mooney viscosity reading above and those referred to below are measured with the large rotor supplied with the instrument, after 4 minutes between the platens of the instrument at 212° F., a one minute warm-up period being used. This is a standard measurement—A. S. T. M. Standards on Rubber Products D-927-49 T. Such Mooney viscosity readings are designated as "ML-4" Mooney viscosities, meaning Mooney viscosity (M), using large rotor (L) with 4 minutes between the platens (4). The degree of softening of the rubber is a direct function of the amount of oxygen absorbed. For example, with a latex, a dried rubber sample of which would have a Mooney viscosity of around 100, the absorption of around 2, 4, 6, 9, 12 and 15 millimoles of oxygen per 100 grams of solids of the latex would give dried rubbers of around 80, 60, 50, 40, 30 and 20 Mooney viscosities respectively.

Example II

To separate samples of the latex of Example I were added 0.4% of cumene hydroperoxide, and 0.06% of ferrous sulfate heptahydrate, and 0.8% of sorbose based on the weight of the latex solids, and various amounts of the tetraammonium salt of ethylene diamine tetraacetic acid, and the latices were oxidized under the same conditions as Example I. The amounts of the tetraammonium salt of ethylene diamine tetraacetic acid used were 0.03, 0.05, 0.06 and 0.2% based on the weight of the latex solids. In the control or check, no amino acid was added. Maximum rates of oxidation (taken from curves) for the above indicated amounts of ethylene diamine tetraacetic acid were respectively, 3.7, 5.5, 8.0 and 10.3 millimoles of oxygen absorbed per 100 grams of latex solids per hour. The maximum rate of absorption without the ethylene diamine tetraacetic acid was 1 millimole of oxygen absorbed per 100 grams of latex solids per hour

Example III

To separate samples of the latex of Example I were added 0.06% of ferrous sulfate heptahydrate, 0.13% of the tetraammonium salt of ethylene diamine tetraacetic acid, 0.8% of sorbose, based on the weight of the latex solids, and various amounts of cumene hydroperoxide, and the latices were oxidized under the same conditions as Example I. The amounts of cumene hydroperoxide were 0.4, 0.8, 1.2, and 3.2% based on the weight of the latex solids. In the control or check no cumene hydroperoxide was added. The maximum rates of oxidation for the above indicated amounts of cumene hydroperoxide were respectively, 9.3, 10.6, 13.3, and 12.6 millimoles of oxygen absorbed per 100 grams of latex solids per hour. The maximum rate of absorption without the cumene hydroperoxide was 0.6 millimole of oxygen absorbed per 100 grams of latex solids per hour.

Example IV

A sample of a latex similar to the latex of Example I was oxidized under the same conditions as in Example I until 6.5 millimoles of oxygen per 100 grams of latex solids had been absorbed. On addition of 0.8% of dimethyl ammonium dimethyl dithiocarbamate based on the latex solids, the rate of absorption of oxygen fell to zero.

Example V

Separate samples of a latex similar to the latex of Example I were oxidized under the same conditions as in Example I except that the sorbose was in one sample replaced by 1.6% of fructose, and in the other sample was replaced by 1% of dihydroxy acetone. After a short induction period in each case, the latex absorbed oxygen at increasing rates up to a maximum of 9 millimoles of oxygen per 100 grams of latex solids per hour in the case of the fructose, and up to a maximum of 10 millimoles of oxygen per 100 grams of latex solids per hour in the case of the dihydroxy acetone.

Example VI

Separate samples of the latex of Example I were oxidized under the same conditions as in Example I except that there was substituted for the 1.2% of cumene hydroperoxide the molar equivalent of various other organic hydroperoxides. The maximum rates of absorption with t-butyl hydroperoxide, cyclohexyl benzene hydroperoxide, p-menthane hydroperoxide, and p-cymene hydroperoxide were 10.2, 11.8, 10.4 and 13.5 millimoles of oxygen absorbed per 100 grams of latex solids per hour, respectively, comparing favorably with the maximum of 12 millimoles of oxygen absorbed per 100 grams of latex solids per hour with the cumene hydroperoxide of Example I.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. Hevea rubber latex which contains oxygen absorbed in the presence of a hydrocarbon hydroperoxide in which an oxygen of the hydroperoxide radical is attached to a tertiary carbon atom, a water-soluble iron salt, an alkali salt of an alkylene polyamine polyacetic acid containing three of five acetic acid groups, and a ketose.

2. As a new product, Hevea rubber latex into which oxygen has been introduced in the presence of a hydrocarbon hydroperoxide in which an oxygen of the hydroperoxide radical is attached to a tertiary carbon atom, a water-soluble iron salt, an alkali salt of an alkylene polyamine polyacetic acid containing three to five acetic acid groups, and a ketose.

3. Softened rubber comprising the solids of Hevea rubber latex into which oxygen has been introduced in the presence of a hydrocarbon hydroperoxide in which an oxygen of the hydroperoxide radical is attached to a tertiary carbon atom, a water-soluble iron salt, an alkali salt of an alkylene polyamine polyacetic acid containing three to five acetic acid groups, and a ketose.

4. Oxidized Hevea rubber latex which contains oxygen absorbed in the presence of cumene hydroperoxide, ferrous sulfate, tetraammonium salt of ethylene diamine tetraacetic acid, and sorbose.

5. Oxidized Hevea rubber latex into which oxygen has been introduced in the presence of cumene hydroperoxide, ferrous sulfate, tetraammonium salt of ethylene diamine tetraacetic acid and dihydroxy acetone.

6. Oxidized Hevea rubber latex into which oxygen has been introduced in the presence of cumene hydroperoxide, ferrous sulfate, tetraammonium salt of ethylene diamine tetraacetic acid, and fructose.

7. Oxidized Hevea rubber latex which contains oxygen absorbed in the presence of t-butyl hydroperoxide, ferrous sulfate, tetraammonium salt of ethylene diamine tetraacetic acid, and sorbose.

8. Oxidized Hevea rubber latex which contains oxygen absorbed in the presence of cyclohexyl benzene hydroperoxide, ferrous sulfate, tetraammonium salt of ethylene diamine tetraacetic acid, and sorbose.

9. A method of softening rubber in latex form which comprises treating Hevea rubber latex with a free-oxygen-containing gas in the presence of a hydrocarbon hydroperoxide in which an oxygen of the hydroperoxide radical is attached to a tertiary carbon atom, a water-soluble iron salt, an alkali salt of an alkylene polyamine polyacetic acid containing three to five acetic acid groups, and a ketose.

10. A method of softening rubber in latex form which comprises treating Hevea rubber latex with a free-oxygen-containing gas in the presence of a hydrocarbon hydroperoxide in which an oxygen of the hydroperoxide radical is attached to a tertiary carbon atom, a water-soluble iron salt, an alkali salt of an alkylene polyamine polyacetic acid containing three to five acetic acid groups, and a ketose, and after absorption of the desired amount of oxygen, adding an alkali salt of a substituted dithiocarbamic acid to the latex.

11. A method of softening rubber in latex form which comprises treating Hevea rubber latex with a free-oxygen-containing gas in the presence of a hydrocarbon hydroperoxide in which an oxygen of the hydroperoxide radical is attached to a tertiary carbon atom, a water-soluble iron salt, an alkali salt of an alkylene polyamine polyacetic acid containing three to five acetic acid groups, and a ketose, until absorption of 2 to 30 millimoles of oxygen per 100 grams of solids of the latex.

12. A method of softening rubber in latex form which comprises treating natural rubber latex with a free-oxygen-containing gas in the presence of a hydrocarbon hydroperoxide in which an oxygen of the hydroperoxide radical is attached to a tertiary carbon atom, a water-soluble iron salt, an alkali salt of an alkylene polyamine polyacetic acid containing three to five acetic acid groups, and a ketose, until absorption of 2 to 30 millimoles of oxygen per 100 grams of solids of the latex, and thereafter adding an alkali salt of a substituted dithiocarbamic acid to the latex.

13. Hevea rubber latex which contains oxygen absorbed in the presence of 0.05 to 5% of an organic hydroperoxide selected from the group consisting of cumene hydroperoxide, p-menthane hydroperoxide, p-cymene hydroperoxide, t-butyl hydroperoxide, cyclohexyl benzene hydroperoxide, diisopropyl benzene hydroperoxide and t-butyl isopropyl benzene hydroperoxide, 0.01 to 0.5% of water-soluble iron salt, 0.05 to 5% of a ketose having the general formula $CH_2OH$—$CO$—$(CHOH)_nH$ where $n$ is an integer from 1 to 5, and 0.01 to 0.5% of an alkali salt of an amino acid having the general formula

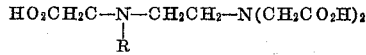

in which R is selected from the group consisting of methyl, ethyl, —$CH_2CO_2H$, and

all percentages being based on the weight of solids of the latex.

14. A method of softening rubber in latex form which comprises treating alkaline Hevea rubber latex with a free-oxygen-containing gas in the presence of an organic hydroperoxide selected from the group consisting of cumene hydroperoxide, p-menthane hydroperoxide, p-cymene hydroperoxide, t-butyl hydroperoxide, cyclohexyl benzene hydroperoxide, diisopropyl benzene hydroperoxide and t-butyl isopropyl benzene hydroperoxide, a water-soluble iron salt, a ketose having the general formula $CH_2OH$—$CO$—$(CHOH)_nH$ where $n$ is an integer from 1 to 5, and an alkali salt of an amino acid having the general formula

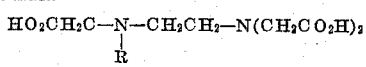

in which R is selected from the group consisting of methyl, ethyl, —$CH_2CO_2H$, and

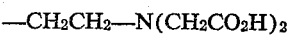

References Cited in the file of this patent

UNITED STATES PATENTS 2,558,764    Lewis _____ July 3, 1951